Figure 1:
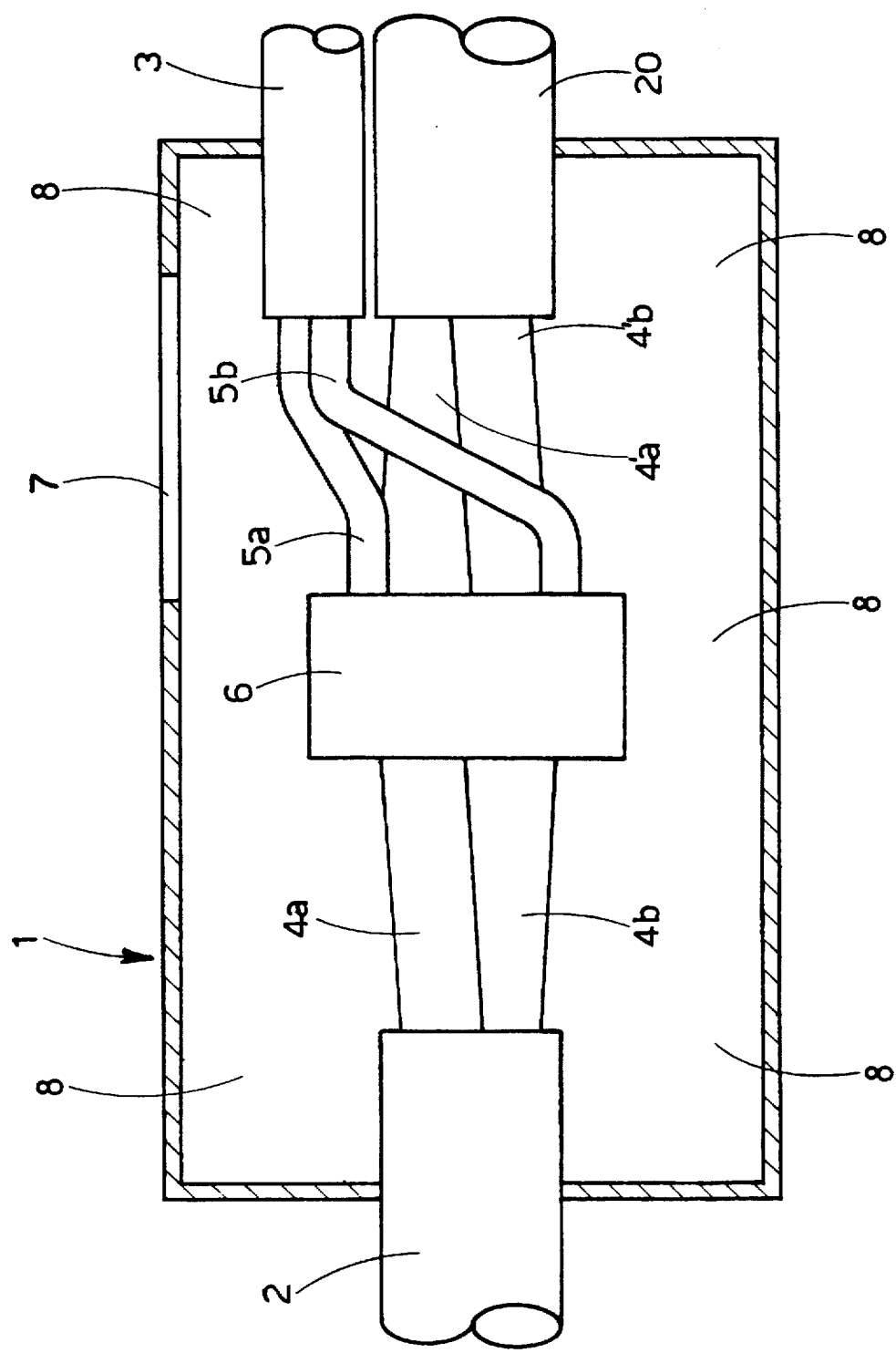

United States Patent [19]
Locatelli et al.

[11] Patent Number: 5,776,606
[45] Date of Patent: Jul. 7, 1998

[54] INSULATING AND ANTICORROSIVE COMPOSITION FOR ELECTRICAL DEVICES

[75] Inventors: Emilio Locatelli, Basiglio; Claudio Bosisio, Brembate Sotto, both of Italy

[73] Assignee: Pirelli Cavi S.p.A., Italy

[21] Appl. No.: 627,981

[22] Filed: Apr. 4, 1996

[30] Foreign Application Priority Data

Apr. 14, 1995 [IT] Italy ................... MI95A0770

[51] Int. Cl.$^6$ .................. H01B 3/26; C08L 95/00
[52] U.S. Cl. ................ 428/357; 524/59; 525/54.4; 106/277; 174/209
[58] Field of Search ............ 524/59; 525/54.4; 106/277; 174/209

[56] References Cited

FOREIGN PATENT DOCUMENTS

| 2245732 | 11/1971 | France ............... C08L 63/00 |
| 3333508 | 3/1985 | Germany ............ C08L 95/00 |
| 1454200 | 10/1976 | United Kingdom ...... C08L 95/00 |

*Primary Examiner*—Richard Weisberger
*Attorney, Agent, or Firm*—Brooks Haidt Haffner & Delahunty

[57] ABSTRACT

Insulating and anticorrosive composition for electrical devices consisting of two semifluid components that are mixed together at the time of application, wherein A) the first component includes
- from 20 to 35 parts (w/w) of a bitumen having a softening point of at least 90° C.,
- from 1.5 to 7 parts (w/w) of a hydrocarbon resin,
- from 0.5 to 5 parts (w/w) of an alkylbenzene,
- from 35 to 60 parts (w/w) of resin oil, and
- from 10 to 30 parts (w/w) of olein, B) the second component includes
- from 40 to 60 parts (w/w) of a mixture of partially hydrogenated terphenyls and quaterphenyls,
- from 0.5 to 5 parts (w/w) of a styrene/butadiene block copolymer,
- from 5 to 30 parts (w/w) of calcium oxide, and
- from 10 to 50 parts (w/w) of calcium hydroxide.

30 Claims, 1 Drawing Sheet

INSULATING AND ANTICORROSIVE COMPOSITION FOR ELECTRICAL DEVICES

The present invention relates to an insulating and anticorrosive composition for electrical devices that may come in contact with water.

More particularly, the present invention relates to a composition consisting of two semifluid components that, at the time of application, are mixed together and form, at the place were the mixture is cast, a solid dielectric and anticorrosive body whose softening point is higher than 80° C.

Moreover, the composition of the present invention can be easily handled by the operator because it does not comprise toxic, irritating or polluting ingredients.

Lastly, the composition of the present invention is endowed with good adherence both to metals and to plastic materials.

It is known that bitumens can be used as insulators of the powered elements of electrical accessories. They exhibit, however, a number of drawbacks.

First of all they have to be heated and melted for them to be cast in the accessory to be insulated and whose powered elements have to be protected. Often said accessory is in the shape of a container and it is practically impossible to fill it up accurately with a bitumen because this tends to solidify too quickly during the casting operation.

On the other hand, bitumens, especially if they have a high softening point, are endowed with limited adherence, particularly to plastic materials.

Lastly, water removes some of their components (separation) and the rate of separation is greater the nearer the temperature is to the softening point. As a consequence, their composition and performance are changed irreversibly.

In order to overcome these drawbacks, the use has been proposed of synthetic resins that can be hardened in situ according to conventional techniques. Examples of such resins are epoxy, acrylic, urethane resins and the like.

Also these resins, however, are not free from drawbacks for the limited safety in use of their components (monomers, pre-polymers and hardeners). Typical examples of toxic components are the isocyanates and the tertiary amines that are used as hardeners in polyurethane and epoxy resins, respectively.

In order to avoid these drawbacks, the Assignee of this application presently uses a composition consisting of two semifluid components (a and b), that are mixed together at the time of application, wherein:

the first component (a) consists of a bitumen having a softening point of about 70° C., resin oil and olein, while the second component (b) consists of a mineral oil, calcium oxide and calcium hydroxide.

This composition will from now on be referred to as A11.

The ingredients of the first component (rosin acids of resin oil and aliphatic acids of olein) react with calcium oxide and hydroxide of the second component to yield a solid mass the use of which is limited to low-voltage accessories, operating up to a maximum temperature of 70° C.

A first limitation of this composition is in the poor adhesion of the solid mass that is formed particularly to elements consisting of plastic materials such as the insulating elements, the semiconductor elements, the sheath of the cable, the containment shell, etc.

A second limitation depends on the fact that the bituminous ingredient has a low softening point and that the solid mass softens during operations as a result of heat and separates out in the presence of water, since some of its components are removed by the water itself.

In order to overcome this drawback an attempt has been made to replace, in the first component (a) of the above-mentioned composition, the bitumen presently used with another having a higher softening point but this has not given good results as component (a) becomes too viscous. It thus becomes difficult to mix the first component (a) and the second component (b) together and the resulting mixture is so viscous that when it is cast it does not fill all the interstices of the electrical device. It is therefore unusable.

The problem to be tackled has therefore been that of reconciling two demands that are in conflict with one another. In fact, in order to raise the softening point of the final solid mixture it is essential to use bitumens with a high softening point but these tend to make the first component (a) and, as a consequence, the final mixture, too viscous. To make the solution of the problem even more complex there were these other constraints:

that the individual ingredients and their reaction products, if any, be biocompatible, not toxic and not irritating, long stability over time of the first and of the second component (a) and (b);

that the composition was not to shrink, during the hardening step;

that the final solid mass has a good adhesion both to metals and to plastic materials;

that the final solid mass be dielectric and not corrosive; and that the final solid mass be resistant to separation in water even at the highest operating temperature of the filled electrical devices (about 90° C.).

It has now surprisingly been found that all these objects are attained by adding a hydrocarbon resin and an alkylbenzene to the first component (a) and by replacing the mineral oil of the second component with a mixture of partially hydrogenated terphenyls and quaterphenyls and also adding a styrene/butadiene block copolymer.

It is therefore a first object of the present invention to provide an insulating and anticorrosive composition for electrical devices consisting of two semifluid components that are mixed together at the time of application, characterised in that A) the first component comprises from 20 to 35 parts (w/w) of a bitumen softening at at least 90° C., from 1.5 to 7 parts (w/w) of a hydrocarbon resin, from 0.5 to 5 parts (w/w) of an alkylbenzene, from 35 to 60 parts (w/w) of resin oil, and from 10 to 30 parts (w/w) of olein, B) the second component comprises from 40 to 60 parts (w/w) of a mixture of partially hydrogenated terphenyls and quaterphenyls, from 0.5 to 5 parts (w/w) of a styrene/butadiene block copolymer, from 5 to 30 parts (w/w) of calcium oxide, and from 10 to 50 parts (w/w) of calcium hydroxide, C) at the time of application 1 part by weight of the first component (A) is mixed with 0.1–0.3 parts by weight of the second component (B).

Preferably, the mixture of the first component (A) with the second component (B) is further characterized in that it comprises:

from 1 to 5 parts (w/w) of said styrene/butadiene block copolymer per 100 parts of bitumen, and from 10 to 35 parts (w/w) of said styrene/butadiene block copolymer per 100 parts of alkylbenzene.

At the time of use, Components A and B are mixed at room temperature for 2 to 5 minutes. Also the cast of the thus obtained mixture into or onto the electrical element is performed at room temperature.

After casting the mixture gels (attainment of a viscosity of about 100 Pa.s) in about 10 to 60 minutes.

In the present description and in the claims appended thereto the expression "room temperature" is used to mean the range of from about +5° C. to about +40° C.

Preferably, the bitumen softens at about 100°–110° C., has a solubility in $CS_2$ of at least 95% by weight, a V.A. Cleveland flash point of at least 300° C., an ash content of less than 1% by weight and a specific weight at 25° C. of about 1.02–1.04 $g/cm^3$.

The expression "hydrocarbon resin" is used to mean a neutral hydrocarbon thermoplastic resin obtained by polymerization of aromatic polymers from the rectification of crude benzols or from the distillation of fossil coal such as, for example, coumarones and indenes.

Preferably, it has a specific weight of 1–1.3 $g/cm^3$, a softening point of from about 90° C. to about 110° C. and an acid number (mg KOH/g) of less than 1.

A typical example of a hydrocarbon resin according to the present invention is Resilene™ 90 by Cambiaghi (Milan) that is a coumarone-indene resin.

The hydrocarbon resin contributes in a signicant manner in increasing adhesion of the composition of the present invention to plastic materials. This feature can be measured with a copper wire having a diameter of about 1.7 mm coated by a polyethylene sheath. A first and a second sample of this wire are respectively plunged for 4 cm into a composition of the present invention and into a comparison composition which is the same as that of the invention, except that the hydrocarbon resin is omitted. Afterwards the two compositions are allowed to harden at room temperature for at least 48 hours and the force required for drawing the wire off from the solid block at the speed of 5 mm/min was measured. For the comparison composition the force required was of 0.7–0.8N while for the composition of the invention it was of 1.4–1.5N. Similar results could be obtained with other substances such as, for example, colophonies. However, hydrocarbon resins are preferred because they are less toxic and less irritating.

In alkylbenzene the alkyl chain is preferably a straight chain and comprises from 10 to 30 carbon atoms. Preferably, the alkylbenzene has a viscosity at 20° C. of from 10 to 500 mPa.s. and a density at 20° C. of about 0.8–0.9 $g/cm^3$; typically it consists of a mixture of homologues with a major portion of octodecylbenzene (alkyl 18C).

A typical alkylbenzene according to the present invention is Polyectrene™ D 100 by Atochem.

The expression "resin oil" is used to mean a liquid comprising a mixture of rosin acids and esters. It can also contain the respective oxidation products and natural triglycerides. Preferably it has an acid number of from 60 to 90 mg KOH/g, a density of from 0.95 to 1.1 $g/cm^3$ and a viscosity of from 1 to 5 Pa.s at 25° C.

The term "olein" is used to mean a mixture of unsaturated aliphatic acids with a major portion of oleic acid. Preferably, it has an acid number of about 200 mg KOH/g and an iodine number (Viys) of from 80 to 100.

A typical example of "mixture of partially hydrogenated terphenyls and quaterphenyls" according to the present invention is Flexaryl™ 9020 by Monsanto.

The styrene/butadiene block copolymer is, preferably, an elastomer having a content of from about 15% to about 30% of styrene and has a specific weight at 20° C. of about 0.92–0.94 $g/cm^3$, a Shore A hardness of from about 30 to about 75, and a resistance to traction of from about 15 to 35 MPa.

A typical example of a styrene/butadiene block copolymer according to the present invention is Cariflex™ TR-1186 M by Shell.

Preferably, in the first Component A, the amount of bitumen is of from 22 to 30 parts (w/w), the amount of hydrocarbon resin is of from 2 to 5 parts (w/w), the amount of alkylbenzene is of from 1 to 3 parts (w/w), the amount of resin oil is of from 40 to 55 parts (w/w) and the amount of olein is of from 15 to 25 parts (w/w).

Furthermore, as regards the second Component B, the preferred amounts of the ingredients are of from 45 to 55 parts (w/w) for partially hydrogenated terphenyls and quaterphenyls, from 1 to 3 parts (w/w) for the styrene/butadiene block copolymer, from 10 to 20 parts (w/w) for calcium oxide, and from 25 to 40 parts (w/w) for calcium hydroxide.

The composition of the present invention can be used as the main insulator of powered elements in accessories at low, medium and high voltage and in copper telecommunications cables, external and anticorrosion protection of sheaths at ground potential in accessories at low, medium and high voltage and in copper telecommunications cables, the buffer element in pressurized cables.

Moreover, it has the following features:

it does not comprise toxic and/or irritating ingredients, the two components (A) and (B) are stable at storage for at least three years;

the two components (A) and (B) are quite mixable at temperatures of from 5° C. to 40° C. and the mixture thus obtained can be cast, at these temperatures, in electrical accessories penetrating in all the interstices, the mixture of the two components (A) and (B) does not give rise to any substantial shrinkage during hardening thanks to the reaction's reduced exothermal effects, the final solid mass adheres well both to metals and to plastic materials, the final solid mass is dielectric (the dielectric strength, measured according to CEI 15/1 specification, is equal to or greater than 12 Kv/mm) and not corrosive, and the final solid mass is completely resistant to separation in water up to at least 90° C.

Therefore, it is a second object of the present invention to provide an electrical element insulated and protected by means of the above mentioned insulating and anticorrosive composition.

The following examples illustrate the present invention without, however, limiting it in any way.

EXAMPLE 1

Preparation of the Composition of the Invention

COMPONENT A 26 parts (w/w) of bitumen S110 by Siba (Novara) were heated under stirring up to about 170°–180° C. At this temperature, 3.9 parts (w/w) of hydrocarbon resin were added under stirring (Resilene™ 90 by Cambiaghi, Milan).

The temperature of the mixture was reduced to about 150° C. and 19 parts (w/w) of an olein (mixture of unsaturated aliphatic acids comprising a major portion of oleic acid) by Rodenia of Rozzano (Milan) and 1.7 parts (w/w) of Polyectrene™ D 100 by Atochem (Milan) were added again under stirring.

The temperature of the mixture was further reduced to about 120° C. and 49.4 parts (w/w) of resin oil (mixture of rosin acids and esters) type UC 94/B by Lombardi (Lucca) were added again under stirring.

When mixing was complete, the mixture was allowed to cool, under gentle stirring, to room temperature. The thus obtained product was a liquid, having a viscosity of about 3.5 Pa.s at room temperature, that was packaged into plastic buckets of various capacities (from 0.6 Kg to 4 Kg net).

COMPONENT B 1.7 parts (w/w) of a styrene/butadiene block copolymer (Cariflex™ 1186 M by Shell, Milan) and 51.4 parts (w/w) of partially hydrogenated terphenyls and quaterphenyls (Flexaryl™ 9020 by Monsanto) were heated and stirred (200 rpm) at about 125°–130° C. and kept at this temperature for about 4–5 hours.

The solution was then allowed to cool to room temperature.

Afterwards, said solution was placed under a fast cowless and 15.4 parts (w/w) of calcium oxide and, then, 31.5 parts of powdered calcium hydroxide were dispersed therein. Stirring continued until a soft and fluid cream was obtained that was packaged in plastic buckets of various capacities (from 0.15 Kg to 1 Kg net).

COMPARATIVE EXAMPLE 1

Component A' was prepared as described in Example 1, except that the Polyectrene™ D 100 was omitted.

The thus obtained Component A' was characterized by a high viscosity (about 50% more than Component A of Example 1).

The mixing of Component A' with Component B gave a product that was very viscous and castable only with difficulty, especially at low temperature (5°–10° C.).

COMPARATIVE EXAMPLE 2

Component B' was prepared as described in Example 1, except that the styrene/butadiene block copolymer was omitted.

The thus obtained Component B' was characterized by a fast sedimentation of the mineral charge already after one month from its preparation.

The mixing of Component B' with Component A' gave a product that, in the presence of water, exhibited manifest signs of separation at 70° C. Separation increased considerably at 80° C. and dramatically at 90° C. (high quantity of floating substances consisting of bituminous products). Moreover, the adhesion of this mixture to high-density polyethylene sheaths was some 50% less than the adhesion of the mixture of Example 1.

EXAMPLE 2

SEPARATION IN WATER 164 g of Component A and 36 g of Component B, prepared as described in Example 1, were intimately mixed together at room temperature for about 3 minutes. The mixture was then placed in a two-liter glass and allowed to harden at room temperature for 24 hours.

The hardened mass was covered with a 10 cm layer of water. The glass was then placed in an air convection oven for 24 hours.

The test was performed on three samples of the mixture of Example 1 maintained at 80°, 90°and 95° C., respectively, for 24 hours, and on three samples of the conventional composition A11 maintained at 70°, 80°and 90° C. for 24 hours.

The conventional composition A11 began to separate at 70° C. and the effect was maximum at 90° C.

In contrast, in the case of the composition of the invention no separation was detected up to 90° C. and a very limited amount of separation was seen at 95° C.

The experiment could not continue at higher temperatures due to the incipient evaporation of water.

The invention will now be illustrated further with reference to the enclosed FIG. 1 that represents a longitudinal cross-section of a conventional element for the protection of joints in electrical cable lines.

The box (1) comprises a conventional multipolar connector (6) that connects together the conductors (4a, 4b; 4'a, 4'b) of two main cables (2, 20) and, in the illustrated example, also the conductors (5a, 5b) of another cable (3).

Once the connection shown in FIG. 1 has been made, the dielectric and anticorrosive composition of the present invention is cast into the box through the opening (7). Said composition penetrates into all the empty spaces (8) and surrounds the cables (2, 20, 3), the conductors (4a, 4b; 4'a, 4'b; 5a, 5b) and the connector (6). After hardening, the composition of the present invention forms a solid mass that adheres to and seals the box (1) and encloses the cables (2, 20, 3), the conductors (4a, 4b; 4'a, 4'b; 5a, 5b) and the connector (6) thus protecting them against the weather. Lastly the opening (7) of the box is closed with a plug not shown.

We claim:

1. An insulating and anticorrosive composition for electrical devices consisting essentially of a mixture of two semifluid components, characterized in that
A) the first component comprises
   from 20 to 35 parts (w/w) of a bitumen having a softening point of at least 90° C.,
   from 1.5 to 7 parts (w/w) of a hydrocarbon resin,
   from 0.5 to 5 parts (w/w) of an alkylbenzene,
   from 35 to 60 parts (w/w) of resin oil comprising a mixture of rosin acids and esters, and
   from 10 to 30 parts (w/w) of olein,
B) the second component comprises
   from 40 to 60 parts (w/w) of a mixture of partially hydrogenated terphenyls and quaterphenyls,
   from 0.5 to 5 parts (w/w) of a styrene/butadiene block copolymer,
   from 5 to 30 parts (w/w) calcium oxide, and
   from 10 to 30 parts (w/w) of calcium hydroxide,
C) and the mixture has 1 part (w/w) of the first component (A) mixed with 0.1–0.3 parts (w/w) of the second component (B).

2. A composition according to claim 1, characterized in that the mixture of the first component (A) with the second component (B) comprises:
   from 1 to 5 parts (w/w) of said styrene/butadiene block copolymer per 100 parts of bitumen, and
   from 10 to 35 parts (w/w) of said styrene/butadiene block copolymer per 100 parts of alkylbenzene.

3. A composition according to claim 1 or 2, characterized in that the bitumen has a softening point of about 100°–110° C.

4. A composition according to claim 5, characterized in that the amount of bitumen is of from 22 to 30 parts (w/w).

5. A composition according to claim 1 or 2, characterized in that the amount of hydrocarbon resin is of from 2 to 5 parts (w/w).

6. A composition according to claim 1 or 2, characterized in that the amount of alkylbenzene is of from 1 to 3 parts (w/w).

7. A composition according to claim 1 or 2, characterized in that the amount of resin oil is of from 40 to 55 parts (w/w).

8. A composition according to claim 1 or 2, characterized in that the amount of olein is of from 15 to 25 parts (w/w).

9. A composition according to claim 1 or 2, characterized in that the amount of the mixture of partially hydrogenated terphenyls and quaterphenyls is of from 45 to 55 parts (w/w).

10. A composition according to claim 1 or 2, characterized in that the amount of styrene/butadiene block copolymer is of from 1 to 3 parts (w/w).

11. A composition according to claim 1 or 2, characterized in that the amount of calcium oxide is of from 10 to 20 parts (w/w).

12. A composition according to claim 1 or 2, characterized in that the amount of calcium hydroxide is of from 25 to 40 parts (w/w).

13. An electrical element insulated and protected by means of an insulating and anticorrosive composition according to claim 1 or 2.

14. Two semifluid mixtures for forming a solid electrical insulating body by mixing of the mixtures, characterized in that one of said mixtures comprises:

from 20 to 35 parts (w/w) of a bitumen having a softening point of at least 90° C., from 1.5 to 7 parts (w/w) of a hydrocarbon resin, from 0.5 to 5 parts (w/w) of an alkylbenzene, from 35 to 60 parts (w/w) of a resin oil comprising a mixture of rosin acids and esters, and from 10 to 30 parts (w/w) of olein, the other of said mixtures comprising:

from 40 to 60 parts (w/w) of a mixture of partially hydrogenated terphenyls and quaterphenyls, from 0.5 to 5 parts (w/w) of a styrene/butadiene block copolymer, from 5 to 30 parts (w/w) calcium oxide, and from 10 to 30 parts (w/w) of calcium hydroxide.

15. Two semifluid mixtures according to claim 14 wherein there is at least 1 part (w/w) of said one of said mixtures for each 0.1–0.3 (w/w) parts of said other of said mixtures.

16. An electrically conductive element electrically insulated by a solid body consisting essentially of a mixture of two components characterized in that:

A) the first component comprises from 20 to 35 parts (w/w) of a bitumen having a softening point of at least 90° C., from 1.5 to 7 parts (w/w) of a hydrocarbon resin, from 0.5 to 5 parts (w/w) of an alkylbenzene, from 35 to 60 parts (w/w) of a resin oil comprising a mixture of rosin acids and esters, and from 10 to 30 parts (w/w) of olein, B) the second component comprises from 40 to 60 parts (w/w) of a mixture of partially hydrogenated terphenyls and quaterphenyls, from 0.5 to 5 parts (w/w) of a styrene/butadiene block copolymer, from 5 to 30 parts (w/w) calcium oxide, and from 10 to 30 parts (w/w) of calcium hydroxide, C) and the mixture has 1 part (w/w) of the first component (a) mixed with 0.1–0.3 parts (w/w) of the second component (B).

17. An electrically conductive element according to claim 16 characterized in that the mixture of the first component (A) with the second component (B) comprises:

from 1 to 5 parts (w/w) of said styrene/butadiene block copolymer per 100 parts of bitumen, and from 10 to 35 parts (w/w) of said styrene/butadiene block copolymer per 100 parts of alkylbenzene.

18. An electrically conductive element according to claim 16 characterized in that the bitumen has a softening point of about 100°–110° C.

19. An electrically conductive element according to claim 18 characterized in that the amount of bitumen is of from 22 to 30 parts (w/w).

20. An electrically conductive element according to claim 16 characterized in that the amount of hydrocarbon resin is of from 2 to 5 parts (w/w).

21. An electrically conductive element according to claim 16 characterized in that the amount of alkylbenzene is of from 1 to 3 parts (w/w).

22. An electrically conductive element according to claim 16 characterized in that the amount of resin oil is of from 40 to 55 parts (w/w).

23. An electrically conductive element according to claim 16 characterized in that the amount of olein is of from 15 to 25 parts (w/w).

24. An electrically conductive element according to claim 16 characterized in that the amount of the mixture of partially hydrogenated terphenyls and quaterphenyls is of from 45 to 55 parts (w/w).

25. An electrically conductive element according to claim 16 characterized in that the amount of styrene/butadiene block copolymer is of from 1 to 3 parts (w/w).

26. An electrically conductive element according to claim 16 characterized in that the amount of calcium oxide is of from 10 to 20 parts (w/w).

27. An electrically conductive element according to claim 16 characterized in that the amount of calcium hydroxide is of from 25 to 40 parts (w/w).

28. A method of making a solid electrical insulating body consisting essentially of two components, said method comprising mixing together one part (w/w) of a first semifluid component with 0.1–0.3 parts (w/w) of a second semifluid component characterized in that:

said first component comprises:

from 20 to 35 parts (w/w) of a bitumen having a softening point of at least 90° C., from 1.5 to 7 parts (w/w) of a hydrocarbon resin, from 0.5 to 5 parts (w/w) of an alkylbenzene, from 35 to 60 parts (w/w) of resin oil comprising a mixture of rosin acids and esters, and from 10 to 30 parts (w/w) of olein, and said second component comprises from 40 to 60 parts (w/w) of a mixture of partially hydrogenated terphenyls and quaterphenyls, from 0.5 to 5 parts (w/w) of a styrene/butadiene block copolymer, from 5 to 30 parts (w/w) calcium oxide, and from 10 to 30 parts (w/w) of calcium hydroxide; and permitting the mixture to solidify.

29. A method according to claim 28 characterized in that said first component and said second component are mixed at room temperature.

30. A method according to claim 29 further comprising applying said mixture to an electrical conductor at room temperature prior to the solidification of the mixture.

* * * * *